(12) United States Patent
Norman (10) Patent No.: US 11,666,988 B2
(45) Date of Patent: Jun. 6, 2023

(54) ADDITIVE MANUFACTURING MACHINE CONDENSATE MONITORING

(71) Applicant: Hamilton Sundstrand Corporation, Charlotte, NC (US)

(72) Inventor: Joshua M. Norman, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 707 days.

(21) Appl. No.: 16/517,951

(22) Filed: Jul. 22, 2019

(65) Prior Publication Data
US 2021/0023654 A1 Jan. 28, 2021

(51) Int. Cl.
*B33Y 10/00* (2015.01)
*B33Y 30/00* (2015.01)
(Continued)

(52) U.S. Cl.
CPC .......... *B23K 26/0643* (2013.01); *B22F 10/28* (2021.01); *B22F 10/31* (2021.01); *B22F 10/70* (2021.01); *B22F 12/60* (2021.01); *B22F 12/90* (2021.01); *B23K 26/067* (2013.01); *B23K 26/34* (2013.01); *B23K 26/354* (2015.10);
(Continued)

(58) Field of Classification Search
CPC .............. B23K 26/0643; B23K 26/354; B23K 26/067; B23K 26/34; B23K 26/342; B33Y 10/00; B33Y 30/00; B33Y 50/02; B33Y 40/00; G01M 11/0285; G02B 26/101; B22F 10/36; B22F 10/366; B22F 12/90;
(Continued)

(56) References Cited

U.S. PATENT DOCUMENTS 6,995,334 B1 2/2006 Kovacevic et al.
8,836,936 B2 9/2014 Lin
(Continued)

FOREIGN PATENT DOCUMENTS

DE 102013219961 A1 4/2015
DE 102016222186 B3 4/2018
EP 3148016 B1 2/2018

OTHER PUBLICATIONS

Extended European Search Report for European Patent Application No. 19215838.4, dated May 18, 2020.

*Primary Examiner* — Sang Y Paik
*Assistant Examiner* — Erwin J Wunderlich
(74) *Attorney, Agent, or Firm* — Kinney & Lange, P.A.

(57) ABSTRACT

An additive manufacturing machine includes a laser light source, a beam entry window, a recoater, a plurality of light sources attached to the recoater, a photosensor, and a controller. The laser light source emits laser light to selectively melt one or more portions of a working layer of a powder bed during additive manufacturing of a part. The beam entry window is positioned between the powder bed and the laser light source. The recoater moves across the powder bed to spread the working layer. The photo sensor senses intensity of light emitted by each of the plurality of light sources through the beam entry window. The controller correlates sensed intensity of the light emitted by each of the plurality of light sources through the beam entry window to corresponding positions on the beam entry window based on locations of each of the plurality of light sources.

20 Claims, 3 Drawing Sheets

(51) Int. Cl.

| | |
|---|---|
| B33Y 50/02 | (2015.01) |
| B23K 26/34 | (2014.01) |
| G01M 11/02 | (2006.01) |
| G02B 26/10 | (2006.01) |
| B22F 12/90 | (2021.01) |
| B22F 10/31 | (2021.01) |
| B29C 64/393 | (2017.01) |
| B33Y 40/00 | (2020.01) |
| B22F 12/49 | (2021.01) |
| B23K 26/354 | (2014.01) |
| B23K 26/06 | (2014.01) |
| B23K 26/067 | (2006.01) |
| B22F 10/28 | (2021.01) |
| B22F 10/70 | (2021.01) |
| B22F 12/60 | (2021.01) |
| B22F 12/42 | (2021.01) |
| B22F 12/45 | (2021.01) |

(52) U.S. Cl.
CPC ............ B29C 64/393 (2017.08); B33Y 10/00 (2014.12); B33Y 30/00 (2014.12); B33Y 40/00 (2014.12); B33Y 50/02 (2014.12); G01M 11/0285 (2013.01); G02B 26/101 (2013.01); *B22F 12/42* (2021.01); *B22F 12/45* (2021.01); *B22F 12/49* (2021.01)

(58) Field of Classification Search
CPC .. B22F 3/00; B22F 12/00; B22F 12/42; B22F 12/60; B22F 12/67; B29C 64/393
USPC .................................................. 219/121.62
See application file for complete search history.

(56) References Cited

U.S. PATENT DOCUMENTS

| | | | |
|---|---|---|---|
| 10,272,525 B1 | 4/2019 | Buller et al. | |
| 10,620,103 B2* | 4/2020 | Godfrey | B33Y 30/00 |
| 10,850,494 B2* | 12/2020 | Haupt | B22F 12/90 |
| 10,981,225 B2* | 4/2021 | Schade | B33Y 30/00 |
| 2012/0298886 A1* | 11/2012 | Petersen | B33Y 30/00 |
| | | | 250/492.1 |
| 2013/0258321 A1* | 10/2013 | Ju | G01N 21/94 |
| | | | 356/73 |
| 2015/0165683 A1* | 6/2015 | Ch | B29C 64/393 |
| | | | 382/141 |
| 2015/0177158 A1* | 6/2015 | Ch | G05B 15/02 |
| | | | 700/119 |
| 2016/0236279 A1* | 8/2016 | Ashton | G01N 21/274 |
| 2017/0282244 A1 | 10/2017 | Mizuno et al. | |
| 2017/0341183 A1* | 11/2017 | Buller | B33Y 30/00 |
| 2018/0036964 A1* | 2/2018 | DehghanNiri | B29C 64/393 |
| 2018/0079029 A1* | 3/2018 | Scott | B23K 26/04 |
| 2018/0126461 A1 | 5/2018 | Buller et al. | |
| 2018/0200957 A1* | 7/2018 | Krüger | B33Y 50/00 |
| 2018/0215102 A1* | 8/2018 | Amaya | B33Y 30/00 |
| 2018/0345582 A1* | 12/2018 | Schade | B22F 10/00 |
| 2019/0118259 A1* | 4/2019 | Varetti | B22F 3/1017 |
| 2019/0219522 A1* | 7/2019 | Izumi | B23K 26/707 |
| 2019/0240906 A1* | 8/2019 | Zeulner | B33Y 30/00 |
| 2019/0337094 A1* | 11/2019 | Werner | B33Y 10/00 |
| 2021/0154771 A1* | 5/2021 | Kenworthy | B22F 10/34 |

* cited by examiner

ADDITIVE MANUFACTURING MACHINE CONDENSATE MONITORING

BACKGROUND

This disclosure relates generally to additive manufacturing processes, and more particularly to the monitoring of transmittance of a beam entry window of an additive manufacturing machine.

Additive manufacturing presents an efficient and flexible option for manufacturing a variety of three-dimensional objects. Powder bed fusion (PBF) is one type of additive manufacturing, among other forms known in the field, and includes the following printing techniques: direct metal laser sintering (DMLS), electron beam melting (EBM), selective heat sintering (SHS), selective laser melting (SLM), and selective laser sintering (SLS). Powder bed fusion techniques of additive manufacturing involve melting and fusing material powder with a radiation beam to manufacture an object layer by layer.

An additive manufacturing machine can have a "dirty" process chamber where the manufacturing occurs, and a separate, sealed optical bench where the laser and related optical instruments are contained. Laser light is typically passed between the optical bench and the process chamber via a window or other optical element.

During additive manufacturing, metal powder can be selectively melted to form individual layers of an object. As a byproduct of the high-energy melting process, some of the metal powder vaporizes, escapes the melt pool, and rapidly solidifies into condensate in the process chamber atmosphere. This condensate, often referred to as soot, is usually removed from the process chamber by filters and a stream of inert gas that is flowed through the process chamber. However, this removal process may be incomplete.

Condensate that is not removed can build up on the surfaces of the process chamber, including on the window between the process chamber and the optical bench. The condensate can degrade the quality of laser light entering the process chamber by attenuating or defocusing the laser light or by warming the beam entry window and distorting the optical properties of the window. Lower quality (or non-uniform) laser light can lead to defects in the manufactured objects. Often, the detection of condensate content by an observer outside the process chamber is difficult or even impossible, thereby limiting evaluations of the chamber for condensate buildup during the additive manufacturing process.

SUMMARY

In one example, an additive manufacturing machine includes a laser light source, a beam entry window, a recoater, a plurality of light sources attached to the recoater, a photosensor, and a controller. The laser light source emits laser light to selectively melt one or more portions of a working layer of a powder bed during additive manufacturing of a part. The beam entry window is positioned between the powder bed and the laser light source. The recoater moves across the powder bed to spread the working layer. The photosensor is positioned between the laser light source and the beam entry window and senses intensity of light emitted by each of the plurality of light sources through the beam entry window. The controller correlates sensed intensity of the light emitted by each of the plurality of light sources through the beam entry window to corresponding positions on the beam entry window based on locations of each of the plurality of light sources relative to the beam entry window during illumination of each of the plurality of light sources. The controller outputs one or more parameters relating to transmittance of the beam entry window based on the sensed intensity of the light emitted by each of the plurality of light sources at the corresponding positions on the beam entry window.

In another example, a method includes moving a recoater across a powder bed of an additive manufacturing machine to spread a working layer of the powder bed; illuminating, during movement of the recoater, a plurality of light sources that are attached to the recoater; and sensing, by a photosensor, intensity of light emitted by each of the plurality of light sources through a beam entry window positioned between the powder bed and a laser light source that is configured to emit laser light to selectively melt one or more portions of the working layer of the powder bed during additive manufacturing of a part. The method further includes correlating, by a controller, the intensity of the light sensed by the photosensor to corresponding positions on the beam entry window based on locations of each of the plurality of light sources relative to the beam entry window during illumination of each of the plurality of light sources. The method further includes outputting, by the controller, one or more parameters relating to transmittance of the beam entry window based on the intensity of the light sensed by the photosensor and the corresponding positions on the beam entry window.

In another example, an additive manufacturing machine includes at least one light source, at least one photosensor, and a beam entry window. The beam entry window is positioned between the at least one light source and the at least one photosensor, such that light emitted by the at least one light source is transmitted through the beam entry window. The at least one photosensor is configured to measure the light transmitted by the at least one light source through a plurality of locations on the beam entry window to monitor transmittance of the beam entry window at each of the plurality of locations.

DETAILED DESCRIPTION

In general, techniques of this disclosure relate to additive manufacturing processes and process monitoring. Condensate that is produced as a byproduct of additive manufacturing can build up on the beam entry window of an additive manufacturing machine, thereby decreasing the quality of laser light that enters the process chamber. According to techniques described herein, intensity of light from light sources within the process chamber are mapped to positions on the beam entry window to identify the presence of condensate on the beam entry window.

Figure 1:
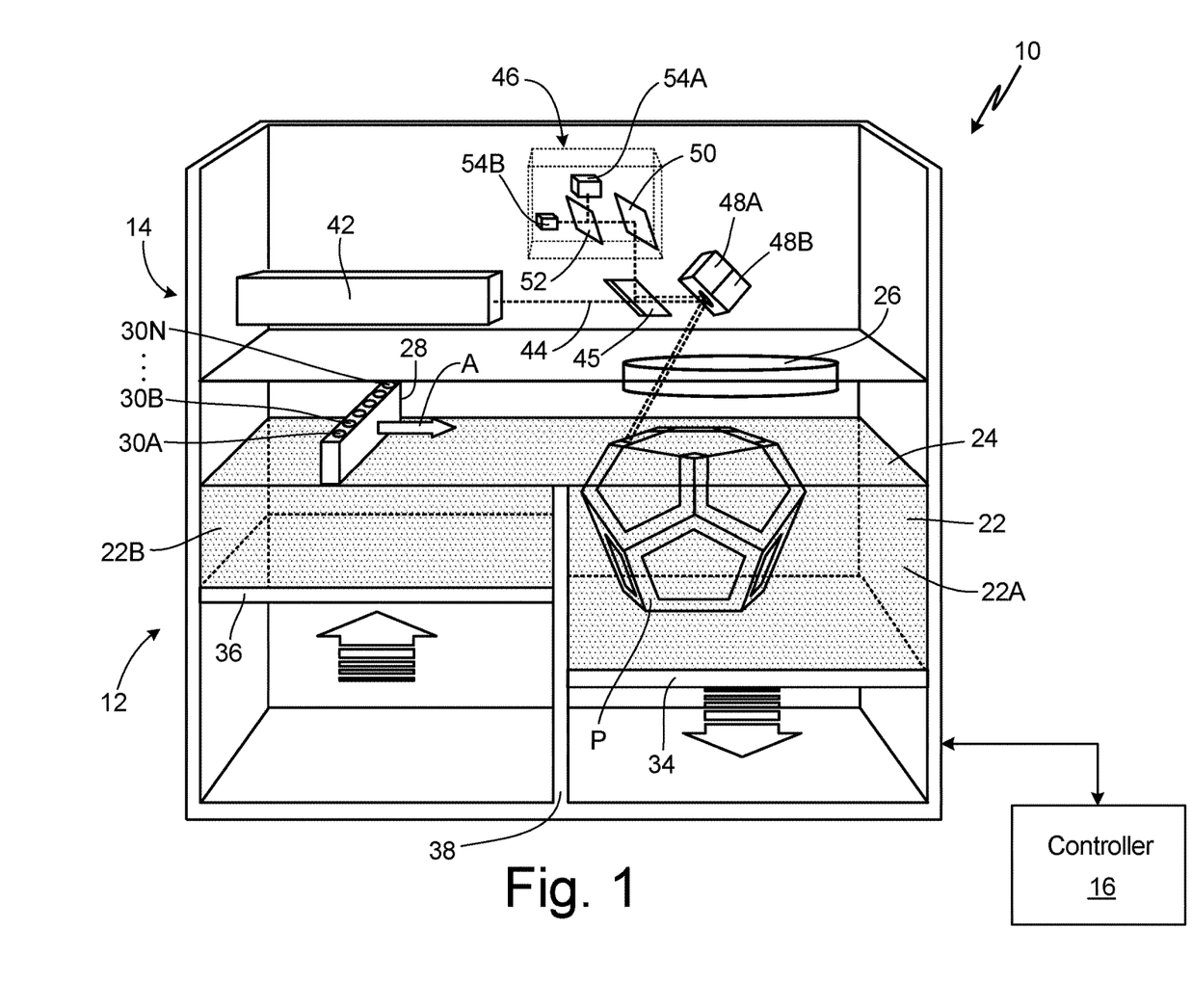
FIGS. 1 and 1A are partially cut away schematic views of an additive manufacturing machine including light sources attached to a recoater.
Figure 1A:
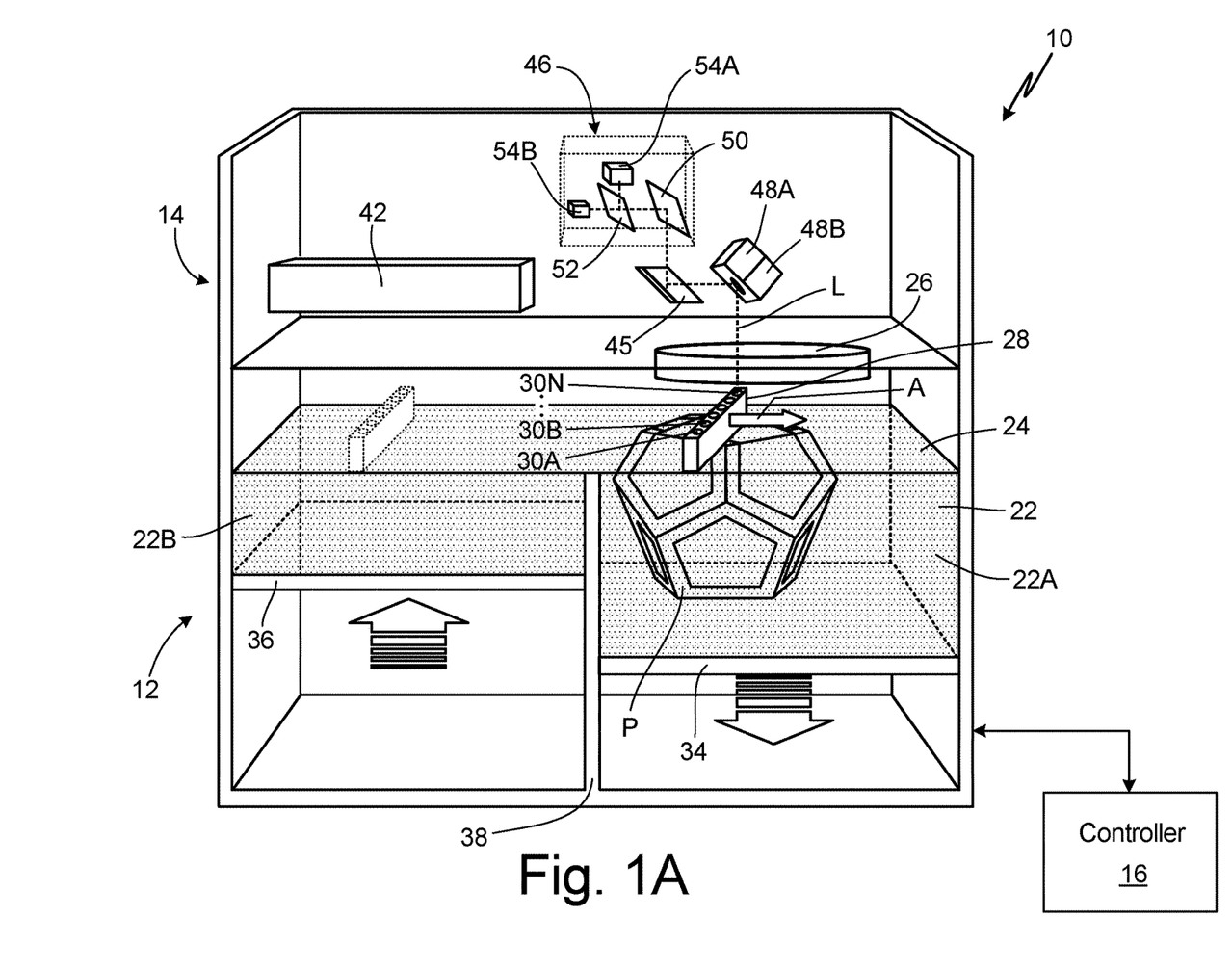

FIGS. 1 and 1A are partially cut away schematic views of additive manufacturing machine 10. Additive manufacturing machine 10 includes process chamber 12 and optical bench 14. Additive manufacturing machine 10 includes and/or is coupled to controller 16. Process chamber 12 includes powder bed 22, working layer 24, beam entry window 26, recoater 28, light sources 30A-30N, build platform 34, supply platform 36, and frame 38. Part P is manufactured within process chamber 12. Optical bench 14 includes: laser light source 42, which emits laser light 44; first beam splitter 45; photosensor 46; first galvanometer mirror 48A; and second galvanometer mirror 48B. Photosensor 46 includes mirror 50, second beam splitter 52, first photodiode 54A, and second photodiode 54B.

As illustrated in FIG. 1, process chamber 12 forms a lower portion of additive manufacturing machine 10. Optical bench 14 forms an upper portion of additive manufacturing machine 10. Frame 38 of process chamber 12 provides physical support for other components of additive manufacturing machine 10. Frame 38 can be, for example, a solid metal structure defining interior voids to contain other components of additive manufacturing machine 10.

The example of FIG. 1 illustrates frame 38 as defining the borders of process chamber 12 and extending vertically between build platform 34 and supply platform 36 to separate powder bed 22 into first basin 22A and second basin 22B. First basin 22A and second basin 22B of powder bed 22 are continuous at working layer 24. Build platform 34 and supply platform 36 define the bottom borders of powder bed 22 within process chamber 12. Build platform 34 is positioned below first basin 22A of powder bed 22. Supply platform 36 is positioned below second basin 22B of powder bed 22. Powder bed 22 can be formed of, for example, a powdered metal (or other material) that is at least partially sinterable, such that the material can be fused to form a solid part.

Recoater 28 is positioned above powder bed 22 within process chamber 12. The example of FIG. 1 illustrates recoater 28 is parallel to and aligned with working layer 24 of powder bed 22. Light sources 30A-30N are attached to recoater 28. Light sources 30A-30N can be, for example, any light sources, including light-emitting diodes (LEDs). Each of light sources 30A-30N can be calibrated to emit light at a defined light intensity. Though the example of FIG. 1 shows light sources 30A-30N arranged in a line across the top surface of recoater 28, it should be understood that in other examples, alternate arrangements of light sources 30A-30N are possible, including multiple rows of light sources or an array of light sources attached to recoater 28.

Beam entry window 26 forms a light-transmissible barrier between process chamber 12 and optical bench 14 in the region above first basin 22A and build platform 34. The example of FIG. 1 illustrates that beam entry window 26 can be parallel to working layer 24. First beam splitter 45, photosensor 46, and galvanometer mirrors 48A-48B are positioned above beam entry window 26 within optical bench 14.

Laser light source 42 is configured to emit laser light 44 toward galvanometer mirrors 48A-48B. As illustrated in the example of FIG. 1, first galvanometer mirror 48A can be positioned adjacent second galvanometer mirror 48B. First beam splitter 45 is positioned in the path of laser light 44. First beam splitter 45 is configured to transmit laser light 44 from laser light source 42 toward galvanometer mirrors 48A-48B, and to reflect light toward photosensor 46. First beam splitter 45 can be, for example, a mirror with a dielectric optical coating.

Photosensor 46 is positioned to receive light reflected by first beam splitter 45. As illustrated in FIG. 1, mirror 50 of photosensor 46 is configured to reflect light received from first beam splitter 45 toward second beam splitter 52 of photosensor 46. Second beam splitter 52 is configured to divide the reflected light so that a portion of the light is reflected toward first photodiode 54A and another portion of the light is reflected toward second photodiode 54B. Second beam splitter 52 can be, for example, a mirror with a dielectric optical coating. Though the example of FIG. 1 illustrates photosensor 46 as including first photodiode 54A and second photodiode 54B, it should be understood that a single photodiode (i.e., one of photodiodes 54A-54B) can be utilized to sense light within photosensor 46. In yet other examples, more than two photodiodes can be used to sense light within photosensor 46. Furthermore, in alternate embodiments, photodiodes 54A-54B can be any sensor able to sense light.

Controller 16 is configured to implement process instructions for operational control of additive manufacturing machine 10. For instance, controller 16 can include one or more processors and computer-readable memory configured to implement functionality and/or process instructions for execution within additive manufacturing machine 10. Examples of one or more processors can include, e.g., any one or more of a microprocessor, a controller, a digital signal processor (DSP), an application specific integrated circuit (ASIC), a field-programmable gate array (FPGA), or other equivalent discrete or integrated logic circuitry.

Computer-readable memory of controller 16 can be configured to store information used by controller 16 during operation of additive manufacturing machine 10. Computer-readable memory, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the computer-readable memory is used to store program instructions for execution by the one or more processors. Computer-readable memory, in one example, is used by software or applications running on controller 16 to temporarily store information during program execution. Computer-readable memory can include volatile and non-volatile memories. Examples of volatile memories can include, e.g., random access memories (RAM), dynamic random access memories (DRAM), static random access memories (SRAM), and other forms of volatile memories. Examples of non-volatile storage elements can include, for example, magnetic hard discs, optical discs, flash memories, or forms of electrically programmable memories (EPROM) or electrically erasable and programmable (EEPROM) memories.

Examples of controller 16 can include any one or more of programmable logic controllers or other computers. Controller 16 can be configured to communicate with any one or more of the components of additive manufacturing machine 10, including: laser light source 42, photosensor 46, photodiodes 54A-54B, galvanometer mirrors 48A-48B, recoater 28, and light sources 30A-30N. Though the example of FIG. 1 illustrates controller 16 as operatively coupled to additive manufacturing machine 10, it should be understood that in other examples, controller 16 can be integrated with additive manufacturing machine 10 to communicate with the components of additive manufacturing machine 10. In yet other examples, controller 16 can include more than one controller device that can be coupled to or integrated with additive manufacturing machine 10 to communicate with the components of additive manufacturing machine 10.

During a manufacturing phase of additive manufacturing machine 10, as illustrated in FIG. 1, laser light source 42 emits laser light 44 through first beam splitter 45 toward galvanometer mirrors 48A-48B. First galvanometer mirror 48A is movable and configured to reflect laser light 44 along a first axis. Second galvanometer mirror 48B is movable and configured to reflect laser light 44 along a second axis that is perpendicular to the first axis. Galvanometer mirrors 48A-48B are configured, in combination, to direct laser light 44 through beam entry window 26 to a target region of working layer 24 (e.g., according to movement instructions provided by or otherwise coordinated by controller 16). Photosensor 46 is positioned with first beam splitter 45 and galvanometer mirrors 48A-48B to aim simultaneously at the target region of working layer 24. Working layer 24 consists of a topmost layer of powdered material of powder bed 22 that is positioned to be melted by laser light 44. Laser light 44 selectively melts (or sinters) the target region of working layer 24 to form a layer of part P. By repeating this process multiple times, monolithic part P can be manufactured in a layer-by-layer manner.

During a recoating phase of additive manufacturing machine 10, controller 16 causes laser light source 42 to stop emitting laser light 44. Build platform 34 and supply platform 36 are moved with respect to frame 38 of process chamber 12 to facilitate layer-by-layer formation of part P by additive manufacturing machine 10. Build platform 34 is configured to lower by a thickness of working layer 24 with respect to frame 38. Supply platform 36 is configured to elevate by a thickness of working layer 24 with respect to frame 38. After elevation of supply platform 36 by a thickness of working layer 24, powdered material can be transferred from second basin 22B to first basin 22A by recoater 28 to form working layer 24. Though the example of FIG. 1 illustrates that working layer 24 is formed by the displacement of second basin 22B relative to first basin 22A (and the corresponding movement of supply platform 36 and build platform 34, respectively), it should be understood that in alternate embodiments, a topmost layer of powdered material can be transferred to powder bed 22 by a hopper or other means associated with recoater 28 to form working layer 24.

As illustrated in FIGS. 1 and 1A, recoater 28 is configured to move in direction A across powder bed 22 to spread working layer 24 (e.g., via control commands provided by controller 16), and to return to an initial position via opposite movement. Movement and positioning of recoater 28 can be controlled, for example, by a stepper motor, feedback from an optical sensor, or other means. As recoater 28 moves, light sources 30A-30N attached to recoater 28 are illuminated in a defined sequence, as is further described below.

As light sources 30A-30N are illuminated, light L emitted by light sources 30A-30N passes through beam entry window 26 to reach photosensor 46 (FIG. 1A). Photosensor 46 can be configured to measure light transmitted through a plurality of locations on beam entry window 26 to monitor transmittance of beam entry window 26 at each location. In the example of FIG. 1A, light L emitted by light sources 30A-30N during a recoating phase is reflected by galvanometer mirrors 48A-48B to first beam splitter 45, and by first beam splitter 45 to photosensor 46. Thus, the light L emitted by light sources 30A-30N can be directed to photosensor 46 by the positioning of galvanometer mirrors 48A-48B. Within photosensor 46, light is reflected by mirror 50 to second beam splitter 52. Light is then reflected by second beam splitter 52 to first photodiode 54A and transmitted from second beam splitter 52 to second photodiode 54B. Photosensor 46 thereby senses intensity of light L emitted by each of the plurality of light sources 30A-30N as light sources 30A-30N are illuminated. The position on beam entry window 26 through which the light passes corresponds to the position of the illuminated light source 30A-30N as recoater 28 moves across powder bed 22.

Controller 16 can be configured to receive position data about recoater 28 to determine the relative position in direction A (or, in certain examples, the return direction opposite to direction A) of attached light sources 30A-30N with respect to working layer 24 and beam entry window 26. Controller 16 can be configured to obtain this position data from, for example, a stepper motor associated with recoater 28, position sensors associated with recoater 28, or another controller. In one example, controller 16 can be configured to aim galvanometer mirrors 48A-48B, and thereby photosensor 46 by synchronous positioning with galvanometer mirrors 48A-48B, at the illuminated light source 30A-30N based on the position of recoater 28 as described above. In another example, controller 16 can be configured to cause galvanometer mirrors 48A-48B to scan an entirety of working layer 24 as each one of the plurality of light sources 30A-30N is illuminated, thereby receiving light intensity data corresponding to an entirety of beam entry window 26 for each illumination of light sources 30A-30N.

Controller 16 is configured to receive light intensity data from photosensor 46. Controller 16 correlates the received light intensity data to corresponding positions on beam entry window 26 through which light passed when light was emitted by each of the plurality of light sources 30A-30N as light sources 30A-30N were illuminated. Based on the light intensity data from photosensor 46, controller 16 is configured to determine transmittance of beam entry window 26. For instance, transmittance of beam entry window 26 can correspond to a difference between received light intensity and the defined light intensity at which each of light sources 30A-30N is configured to emit.

Controller 16 can be configured to output one or more parameters relating to the transmittance of beam entry window 26 at the corresponding positions through which light intensity was sensed by photosensor 46. For instance, the one or more parameters relating to the transmittance can include the determined transmittance of beam entry window 26 corresponding to the positions through which the light intensity was sensed by photosensor 46. In certain examples, the one or more parameters relating to the transmittance of beam entry window 26 can include an indication of whether the intensity is less than (or equal to) a threshold transmittance (or intensity) value. A threshold transmittance value can be defined, for example, by requirements for operational levels of laser light 44 during additive manufacturing. In some examples, controller 16 can be configured to output an alert if the one or more parameters relating to transmittance of beam entry window 26 are at or below a threshold transmittance (or intensity).

Decreased transmittance at a position on beam entry window 26 can indicate a buildup of condensate on the surface of beam entry window 26 that is exposed to process chamber 12. Condensate buildup on beam entry window 26 degrades the quality of laser light 44 entering process chamber 12, and additive manufacturing machine 10 can be utilized to resolve this issue by determining (1) if there are any areas of condensate buildup on beam entry window 26; (2) if present, where the condensate buildup is located on the surface of beam entry window 26; and (3) how much transmittance of beam entry window 26 has been affected at those locations compared to predetermined threshold levels. Determining one or more parameters relating to the transmittance enables active, automated, and reproducible detection of condensate buildup on beam entry window 26 during additive manufacturing. For example, an output alert from controller 16 can trigger a process to abort a build before the part is completed or to stop processing parts in the affected zones. An alert can also trigger, for example, a cleaning process for beam entry window 26 in zones where it has been determined that condensate content is present.

Figure 2:
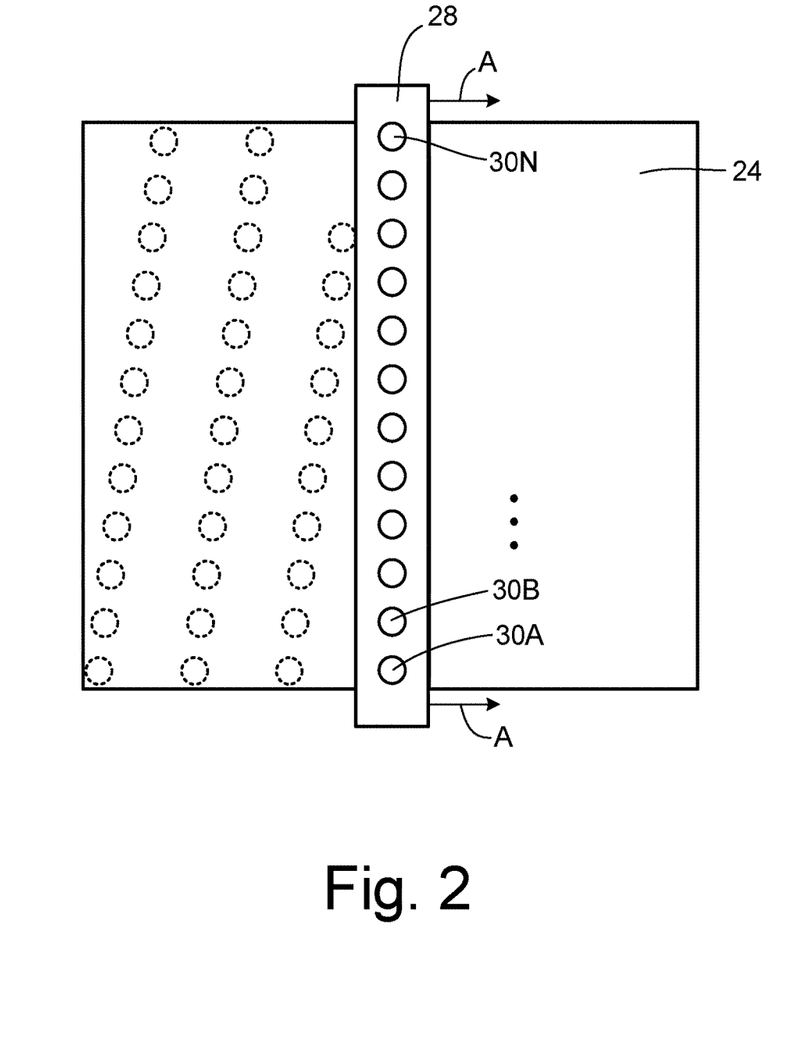
FIG. 2 is a top-down schematic view of the recoater spreading a working layer of powdered material showing sequential illumination of the light sources.

FIG. 2 is a top-down schematic view of recoater 28 spreading working layer 24 showing sequential illumination of light sources 30A-30N. As described above, recoater 28 is configured to move in direction A to spread working layer 24. Though the example of FIG. 2 shows light sources 30A-30N arranged in a line across the top surface of recoater 28, it should be understood that in other examples, alternate arrangements of light sources 30A-30N are possible, including multiple rows of light sources or an array of light sources attached to recoater 28. Furthermore, though the example of FIG. 2 shows light sources 30A-30N are illuminated in a defined sequence as recoater 28 moves in direction A, it should be understood that alternate embodiments can include, alternatively or additionally, illuminating light sources 30A-30N as recoater 28 returns to an initial position (opposite direction A) or during any movement of recoater 28.

Light sources 30A-30N are energized to illuminate in a defined sequence as recoater 28 moves. Light sources 30A-30N can be configured to be illuminated one-at-a-time so that no two of the light sources are illuminated simultaneously, thereby decreasing an amount of ambient light within process chamber 12 (FIG. 1) and increasing a signal-to-noise ratio of the sensed light intensity. Positions corresponding to the location of a previously illuminated light source 30A-30N are indicated by dashed circles in FIG. 2. In the exaggerated example of FIG. 2, the positions of illuminated light sources 30A-30N are shown to create oblique paths in a raster pattern across working layer 24 due to the movement of recoater 28 for purposes of clarity and ease of discussion. In operation, light sources 30A-30N can be rapidly illuminated, in sequence, as recoater 28 moves across the surface of working layer 24. As such, the distance in direction A between the positions of light sources 30A-30N when illuminated can be very small (e.g., one hundredth of a millimeter, one tenth of a millimeter, a millimeter, or other distances), thereby providing substantially constant intensity information for the entirety of the surface beam entry window 26 (FIG. 1).

While the example of FIG. 2 shows twelve individual light sources 30A-30N positioned at a top surface of recoater 28, it should be understood that the reference "N" represents an arbitrary number, such that light sources 30A-30N can include any number of individual light sources (e.g., more or less than the illustrated twelve individual light sources). Similarly, while the example of FIG. 2 shows the sequential illumination of light sources 30A-30N, it should be understood that light sources 30A-30N can be illuminated in any defined pattern and/or frequency.

In operation, controller 16 (FIG. 1) causes light sources 30A-30N to illuminate in a defined sequence during movement of recoater 28, such as during the spreading of working layer 24 in direction A and/or during the return movement of recoater 28 in the direction opposite direction A. Controller 16 causes galvanometer mirrors 48A-48B (FIG. 1) to direct light from the illuminated one of light sources 30A-30N toward photosensor 46 (FIG. 1), such as by aiming galvanometer mirrors 48A-48B at the illuminated one of light sources 30A-30N according to the defined pattern of illumination. Controller 16 correlates sensed intensity of the light emitted by the illuminated one of light sources 30A-30N with a position of the illuminated one of light sources 30A-30N relative to beam entry window 26 (FIG. 1). As such, controller 16 determines sensed intensity of the emitted light and the corresponding transmittance of beam entry window 26 across a surface of beam entry window 26 as recoater 28 moves across working layer 24.

Accordingly, techniques of this disclosure enable intensity of light from light sources within the process chamber to be mapped to positions on beam entry window 26 to identify the presence of condensate at the corresponding positions. The techniques described herein therefore enable active, automated, and reproducible detection of condensate buildup on beam entry window 26 during additive manufacturing operations.

Discussion of Possible Embodiments

The following are non-exclusive descriptions of possible embodiments of the present invention.

An additive manufacturing machine includes a laser light source, a beam entry window, a recoater, a plurality of light sources attached to the recoater, a photosensor, and a controller. The laser light source emits laser light to selectively melt one or more portions of a working layer of a powder bed during additive manufacturing of a part. The beam entry window is positioned between the powder bed and the laser light source. The recoater moves across the powder bed to spread the working layer. The photosensor is positioned between the laser light source and the beam entry window and senses intensity of light emitted by each of the plurality of light sources through the beam entry window. The controller correlates the sensed intensity of the light emitted by each of the plurality of light sources through the beam entry window to corresponding positions on the beam entry window based on locations of each of the plurality of light sources relative to the beam entry window during illumination of each of the plurality of light sources. The controller outputs one or more parameters relating to transmittance of the beam entry window based on the sensed intensity of the light emitted by each of the plurality of light sources at the corresponding positions on the beam entry window.

The additive manufacturing machine of the preceding paragraph can optionally include, additionally and/or alternatively, any one or more of the following features, configurations and/or additional components:

The controller can cause each of the plurality of light sources to illuminate in a defined sequence as the recoater moves across the powder bed.

Each of the plurality of light sources can be illuminated one-at-a-time so that no two of the plurality of light sources is illuminated simultaneously.

The additive manufacturing machine can further include a first galvanometer mirror that is movable to reflect the laser light along a first axis, a second galvanometer mirror that is movable to reflect the laser light along a second axis that is perpendicular to the first axis, and a beam splitter that is positioned to receive the light emitted by each of the plurality of light sources.

The controller can cause the first galvanometer mirror and the second galvanometer mirror to move to direct the light emitted by each of the plurality of light sources to the beam splitter. The beam splitter can direct the light emitted by each of the plurality of light sources to the photosensor during a recoating phase of additive manufacturing.

Each of the plurality of light sources can be positioned at a top surface of the recoater.

The controller can output an alert in response to determining that the one or more parameters relating to transmittance of the beam entry window indicate a transmittance that is less than a threshold transmittance.

The alert can indicate a location on the beam entry window corresponding to the transmittance that is less than the threshold transmittance.

The controller can output the alert during the additive manufacturing of the part.

The threshold transmittance can be based on requirements for operational levels of the laser light during the additive manufacturing of the part.

A method includes moving a recoater across a powder bed of an additive manufacturing machine to spread a working layer of the powder bed; illuminating, during movement of the recoater, a plurality of light sources that are attached to the recoater; and sensing, by a photosensor, intensity of light emitted by each of the plurality of light sources through a beam entry window positioned between the powder bed and a laser light source that is configured to emit laser light to selectively melt one or more portions of the working layer of the powder bed during additive manufacturing of a part. The method further includes correlating, by a controller, the intensity of the light sensed by the photosensor to corresponding positions on the beam entry window based on locations of each of the plurality of light sources relative to the beam entry window during illumination of each of the plurality of light sources. The method further includes outputting, by the controller, one or more parameters relating to transmittance of the beam entry window based on the intensity of the light sensed by the photosensor and the corresponding positions on the beam entry window.

The method of the preceding paragraph can optionally include, additionally and/or alternatively, any one or more of the following features, configurations, operations, and/or additional components:

Illuminating the plurality of light sources can include illuminating each of the plurality of light sources in a defined sequence as the recoater moves across the powder bed.

Illuminating the plurality of light sources can include illuminating each of the plurality of light sources one-at-a-time so that no two of the plurality of light sources is illuminated simultaneously.

The method can further include moving a first galvanometer mirror and a second galvanometer mirror to direct the light emitted by each of the plurality of light sources to a beam splitter, and directing, by the beam splitter, the light emitted by each of the plurality of light sources to the photosensor.

Each of the plurality of light sources can be positioned at a top surface of the recoater.

Outputting the one or more parameters relating to the transmittance of the beam entry window can include outputting an alert in response to determining that the one or more parameters relating to transmittance of the beam entry window indicate a transmittance that is less than a threshold transmittance.

The alert can indicate a location on the beam entry window corresponding to the transmittance that is less than the threshold transmittance.

Outputting the alert can include outputting the alert during the additive manufacturing of the part.

The threshold transmittance can be based on requirements for operational levels of the laser light during the additive manufacturing of the part.

Each of the plurality of light sources can be a light-emitting diode (LED).

An additive manufacturing machine includes at least one light source, at least one photosensor, and a beam entry window. The beam entry window is positioned between the at least one light source and the at least one photosensor, such that light emitted by the at least one light source is transmitted through the beam entry window. The at least one photosensor is configured to measure the light transmitted by the at least one light source through a plurality of locations on the beam entry window to monitor transmittance of the beam entry window at each of the plurality of locations.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An additive manufacturing machine comprising:
a laser light source that emits laser light to selectively melt one or more portions of a working layer of a powder bed during additive manufacturing of a part;
a beam entry window positioned between the powder bed and an optical bench that includes the laser light source;
a recoater that moves across the powder bed to spread the working layer;
a plurality of light sources attached to the recoater and positioned on a side of the recoater that faces the beam entry window such that light emitted by each of the plurality of light sources is directed at the beam entry window;
a photosensor, positioned within the optical bench, that senses intensity of the light emitted by each of the plurality of light sources through the beam entry window; and
a controller that:
aims the photosensor to receive the light emitted by each of the plurality of light sources;
correlates sensed intensity of the light emitted by each of the plurality of light sources through the beam entry window to corresponding positions on the beam entry window; and
outputs one or more parameters relating to transmittance of the beam entry window based on the sensed intensity of the light emitted by each of the plurality of light sources at the corresponding positions on the beam entry window to provide detection of condensate buildup on the beam entry window during the additive manufacturing of the part.

2. The additive manufacturing machine of claim 1, wherein the controller causes each of the plurality of light sources to illuminate in a defined sequence as the recoater moves across the powder bed.

3. The additive manufacturing machine of claim 1, wherein each of the plurality of light sources is illuminated one-at-a-time so that no two of the plurality of light sources is illuminated simultaneously.

4. The additive manufacturing machine of claim 1, further comprising:
a first galvanometer mirror that is movable to reflect the laser light from the laser light source and the light emitted by each of the plurality of light sources along a first axis;
a second galvanometer mirror that is movable to reflect the laser light from the laser light source and the light emitted by each of the plurality of light sources along a second axis that is perpendicular to the first axis; and
a beam splitter that is positioned such that the laser light from the laser light source passes through the beam splitter toward the first and second galvanometer mirrors during a manufacturing phase of additive manufacturing and such that the beam splitter receives the light emitted by each of the plurality of light sources during a recoating phase of additive manufacturing.

5. The additive manufacturing machine of claim 4, wherein the controller causes the first galvanometer mirror and the second galvanometer mirror to move to direct the light emitted by each of the plurality of light sources to the beam splitter, and the beam splitter directs the light emitted by each of the plurality of light sources to the photosensor during the recoating phase.

6. The additive manufacturing machine of claim 1, wherein the controller outputs an alert in response to determining that the one or more parameters relating to transmittance of the beam entry window indicate a transmittance that is less than a threshold transmittance.

7. The additive manufacturing machine of claim 6, wherein the alert indicates a location on the beam entry window corresponding to the transmittance that is less than the threshold transmittance.

8. The additive manufacturing machine of claim 6, wherein the controller outputs the alert during the additive manufacturing of the part.

9. The additive manufacturing machine of claim 1, wherein the laser light source emits the laser light during a manufacturing phase of additive manufacturing, and wherein the plurality of light sources emit light during a recoating phase of additive manufacturing.

10. The additive manufacturing machine of claim 1, wherein each of the plurality of light sources are calibrated to emit light at a defined intensity.

11. The additive manufacturing machine of claim 4, wherein the controller aims the photosensor by synchronous positioning with the first and second galvanometer mirrors.

12. A method comprising:
moving a recoater across a powder bed of an additive manufacturing machine to spread a working layer of the powder bed;
illuminating, during movement of the recoater, a plurality of light sources that are attached to the recoater and positioned on a side of the recoater that faces a beam entry window such that light emitted by each of the plurality of light sources is directed at the beam entry window;
aiming a photosensor to receive the light emitted by each of the plurality of light sources, wherein the photosensor is aimed by a controller;
sensing, by the photosensor, intensity of the light emitted by each of the plurality of light sources through the beam entry window positioned between the powder bed and an optical bench that includes a laser light source that is configured to emit laser light to selectively melt one or more portions of the working layer of the powder bed during additive manufacturing of a part;
correlating, by the controller, the intensity of the light sensed by the photosensor to corresponding positions on the beam entry; and
outputting, by the controller, one or more parameters relating to transmittance of the beam entry window based on the intensity of the light sensed by the photosensor and the corresponding positions on the beam entry window to provide detection of condensate buildup on the beam entry window during the additive manufacturing of the part.

13. The method of claim 12, wherein illuminating the plurality of light sources comprises illuminating each of the plurality of light sources in a defined sequence as the recoater moves across the powder bed.

14. The method of claim 12, wherein illuminating the plurality of light sources comprises illuminating each of the plurality of light sources one-at-a-time so that no two of the plurality of light sources is illuminated simultaneously.

15. The method of claim 12, further comprising:
moving a first galvanometer mirror and a second galvanometer mirror to direct the light emitted by each of the plurality of light sources to a beam splitter; and
directing, by the beam splitter, the light emitted by each of the plurality of light sources to the photosensor.

16. The method of claim 12, further comprising:
determining if the one or more parameters relating to transmittance of the beam entry window indicate a transmittance that is less than a threshold transmittance; and
outputting an alert in response to determining that the one or more parameters relating to transmittance of the beam entry window indicate the transmittance that is less than the threshold transmittance.

17. The method of claim 16, wherein the alert indicates a location on the beam entry window corresponding to the transmittance that is less than the threshold transmittance.

18. The method of claim 16, wherein outputting the alert comprises outputting the alert during the additive manufacturing of the part.

19. The method of claim 15, wherein aiming the photosensor further comprises aiming the photosensor by synchronous positioning with the first and second galvanometer mirrors.

20. An additive manufacturing machine comprising:
a plurality of light sources attached to a movable recoater;
at least one photosensor; and
a beam entry window, positioned between the plurality of light sources and the at least one photosensor;
wherein the plurality of light sources is attached to the recoater and positioned on a side of the recoater that faces the beam entry window such that light emitted by the plurality of light sources is directed at the beam entry window and is transmitted through the beam entry window; and
wherein the at least one photosensor is configured to measure the light transmitted by the plurality of light sources through a plurality of locations on the beam entry window to monitor transmittance of the beam entry window at each of the plurality of locations to provide detection of condensate buildup on the beam entry window during additive manufacturing.

* * * * *